United States Patent
Nagasawa et al.

(10) Patent No.: US 6,684,306 B1
(45) Date of Patent: Jan. 27, 2004

(54) DATA BACKUP IN PRESENCE OF PENDING HAZARD

(75) Inventors: Teruo Nagasawa, Odawara (JP); Takahisa Kimura, Odawara (JP); Takeshi Koide, Odawara (JP)

(73) Assignee: Hitachi, Ltd., Tokyo (JP)

( * ) Notice: Subject to any disclaimer, the term of this patent is extended or adjusted under 35 U.S.C. 154(b) by 422 days.

(21) Appl. No.: 09/616,829

(22) Filed: Jul. 14, 2000

(30) Foreign Application Priority Data

Dec. 16, 1999 (JP) .......................................... P11-356970

(51) Int. Cl.[7] .............................................. G06F 12/00
(52) U.S. Cl. ...................... 711/162; 711/161; 711/154; 714/15; 714/24; 714/47
(58) Field of Search ................................ 711/162, 161, 711/154; 714/15, 24, 47

(56) References Cited

U.S. PATENT DOCUMENTS

| | | | | |
|---|---|---|---|---|
| 5,202,887 A | * | 4/1993 | Ueno et al. ..................... | 714/8 |
| 5,285,451 A | * | 2/1994 | Henson et al. .................. | 714/6 |
| 5,444,433 A | * | 8/1995 | Gropper ....................... | 340/601 |
| 5,584,009 A | * | 12/1996 | Garibay et al. ................ | 711/117 |
| 5,615,329 A | * | 3/1997 | Kern et al. ..................... | 714/6 |
| 5,615,402 A | * | 3/1997 | Quattromani et al. .......... | 712/38 |
| 5,742,792 A | | 4/1998 | Yanai et al. ................... | 395/489 |
| 5,878,377 A | * | 3/1999 | Hamilton et al. ............... | 702/132 |
| 6,002,347 A | * | 12/1999 | Daly et al. .................... | 340/963 |
| 6,044,444 A | * | 3/2000 | Ofek ............................ | 711/162 |
| 6,058,491 A | * | 5/2000 | Bossen et al. .................. | 714/15 |
| 6,098,128 A | * | 8/2000 | Velez-McCaskey et al. .. | 710/65 |
| 6,173,377 B1 | * | 1/2001 | Yanai et al. ................... | 711/162 |
| 6,308,289 B1 | * | 10/2001 | Ahrens et al. ................. | 714/48 |

FOREIGN PATENT DOCUMENTS

| | | | | |
|---|---|---|---|---|
| JP | 11024778 | 1/1999 | ............. | G06F/1/00 |
| JP | 11085408 | 3/1999 | ............. | G06F/3/06 |

OTHER PUBLICATIONS

Takahashi, Mihiro, Japanese Patent Application No. 11–24778, published Jan. 29, 1999, machine assisted translation.*

* cited by examiner

Primary Examiner—Matthew Kim
Assistant Examiner—Stephen Elmore
(74) Attorney, Agent, or Firm—Townsend and Townsend and Crew LLP

(57) ABSTRACT

According to the present invention, techniques for performing real time backup of data in the presence of a pending hazard, such as a natural disaster, or the like are disclosed. Embodiments of the invention provide data storage controllers, networked data storage systems, methods and the like, that detect imminent hazardous conditions and alter backup behavior to provide greater integrity of backed up data. In a representative embodiment according to the present invention, update of the primary data is temporarily suspended after the recognition of a probable occurrence of a hazardous event. By suspending updating the primary data temporarily, the increase of un-updated secondary data can be prevented, so that lost data is decreased. Then, the un-updated secondary data can be updated quickly or exclusively, in order to avoid un-updated secondary data.

24 Claims, 9 Drawing Sheets

FIG. 2C
Hazard Sensor Activated Mode (when in danger)

FIG. 2B
Stand-alone Ordinary Process

FIG.3A

FIG.3B
asynchronous copy

FIG.3C
synchronous copy

DATA BACKUP IN PRESENCE OF PENDING HAZARD

CROSS-REFERENCES TO RELATED APPLICATIONS

This application claims priority from Japanese Patent Application Reference No. 11-356970, filed Dec. 16, 1999.

BACKGROUND OF THE INVENTION

The present invention is related generally to techniques for performing real time backup and copying of data, and specifically to techniques for updating data in the event of an emergency.

Conventional real time remote copy technology provides real time backups of system data in data storage controllers. Backups are prepared and forwarded to a system distant from the system being backed up. The backup data is updated in real time, so that it can be used in order to recover quickly from trouble, such as system faults and the like, for example. Backup data ("secondary data") is expected to be located as far away from the data ("primary data") of a working system ("primary system") in order to prevent damage to the secondary data caused by a wide spread disaster such as an earthquake, for example. In order to keep the secondary data to be completely coincident with the primary data after updating the primary data, it is also necessary to proceed to the next step in the primary system processing only after confirming that the secondary data has been updated ("perform a synchronous remote copy").

However, the farther a storage device for storing the secondary data is located, the longer the data transfer time and therefore, the communication time for the confirmation of the completion of updating the secondary data, can become. As a result, the processing performance of the primary system deteriorates with increasing distance.

What is needed are improved techniques for performing data backup.

SUMMARY OF THE INVENTION

According to the present invention, techniques for performing real time backup of data in the presence of a pending hazard, such as a natural disaster, or the like, are provided. Embodiments can provide data storage controllers, networked data storage systems, methods and the like, that detect imminent hazardous conditions and alter backup behavior to provide greater integrity of backed up data.

In a representative embodiment according to the present invention, a data storage apparatus is provided. The data storage apparatus can comprise one or more storage media; a cache memory; and a controller. The controller can move data into and out of the storage media and the cache memory. The controller can also receive data from an external source for storage, for example. Further, the data storage apparatus can comprise a hazard sensor. Responsive to the hazard sensor detecting a probable occurrence of a hazardous event, the controller can copy data from the cache memory to the storage media in order to preserve a copy of the data.

In another representative embodiment according to the present invention, update of primary data can be temporarily suspended after the recognition of a probable occurrence of a hazardous event. By suspending updating the primary data temporarily, the presence of un-updated data can be minimized, so that lost data is decreased. Then, the secondary data can be updated quickly or exclusively, in order to avoid inconsistent copies of secondary data.

In a further representative embodiment according to the present invention, an asynchronous copy operation can be temporarily suspended after the recognition of a probable occurrence of a hazardous event, and the copy mode can be changed from the asynchronous copy mode to a synchronous copy mode. Updating of the secondary data can then proceed using a synchronous copy mode so that data loss can be minimized.

In a still further representative embodiment according to the present invention, a link to a remotable storage system can be provided. The controller can copy data over the link to the remotable storage system in order to make a remote backup. A primary disk controller can prioritize the remote copying instead of storing the data into the local non-volatile disk, for example. Specific embodiments that perform such remote copying use the remote system as a backup while the local system is down for some reason. In such case, the remote system can replace the local system. If the local system is damaged by a serious disaster, it is not useful to keep the data at the local site. Thus, in such cases, the primary storage system can prioritize the remote copying with respect to storing data to a local non-volatile disk, for example.

In a still yet further representative embodiment according to the present invention, a data storage controller can prioritize the data storage to a local non-volatile disk. This can be especially useful in installations where the remote copying is used to create the remote data merely as a backup data. In such embodiments, remote copying provides a non-stop data backup, while the backup to the other media such as magnetic tape, for example, requires stopping of the operation of the system. Thus, in case of a serious disaster, it may be important to store the data at the local site (to a non-volatile disk, for example). Another embodiment in which higher priority may be given to local copying are installations where there is a possibility that the remote copying path could also break down. In such installations, it is of little use to copy the data to the remote site. Thus, in such embodiments, storing the data at the local site, to a non-volatile disk, or the like, will be given a higher priority over making a remote copy of the data.

In specific embodiments in which the primary system comprises a plurality of storage controllers, recorded data can be distributed across two or more of the plurality of storage controllers, to storage devices that are connected to each of a plurality of storage controllers, for example. In such embodiments, the present invention provides for maintaining updated copies of data across the plurality of storage controllers. In a specific embodiment, the storage controllers of the primary system can be provided with a common communication line connecting them together. Once interconnected, the storage controllers can coordinate backup copying of data in order to prevent data loss.

Numerous benefits are achieved by way of the present invention over conventional techniques. The present invention can provide real time data backup and copy functions from a primary system to a secondary system switchable between a synchronous and an asynchronous copy mode. Backup may be made to a remote backup system, for example. Specific embodiments can reduce or eliminate loss of un-copied data by recognizing an imminent hazard of un-copied data loss caused by a disaster, for example. Specific embodiments can reduce or eliminate data loss, as well as reduce or eliminate possibility of inconsistent data sets in a system. Embodiments can comprise stand alone data storage units, methods and systems with multiple data storage media, for example. Further, embodiments can change priority of making local copies relative to making remote copies upon recognition of a probable occurrence of a hazardous event.

These and other benefits are described throughout the present specification. A further understanding of the nature and advantages of the invention herein may be realized by reference to the remaining portions of the specification and the attached drawings.

DESCRIPTION OF THE SPECIFIC EMBODIMENTS

The present invention provides techniques for performing real time backup of data in the presence of a pending hazard, such as a natural disaster, or the like. Embodiments can provide data storage controllers, networked data storage systems, methods and the like, that detect imminent hazardous conditions and alter backup behavior to provide greater integrity of backed up data. In a specific embodiment, a system that updates data to a backup device after updating an original copy of the data, is provided. The system can include a recognition part, such as a device that detects a probable occurrence of a hazardous event. The detection device can comprise a sensor within the storage controller, for example. Sensors can include an earthquake sensor, a fire sensor, a smoke sensor, a moisture sensor, a flood sensor, a thunderstorm sensor or a supply voltage sensor. In specific embodiments, the detection device can comprise, for example, a receiver that receives the relevant information relating to the probable occurrence of a hazardous event from an external device or that receives a warning signal from an external device.

Data loss can occur when the primary system suffers a sudden outage caused by a disaster, for example, before the data recorded as the primary data has been recorded to the secondary system. In case of the asynchronous remote copy, the primary system operation is persistently continued by updating only the primary data, and then the secondary data is updated asynchronously. Accordingly, a condition can occur wherein data is stored only in the recording media of the primary data. Therefore, data loss cannot be avoided if the primary data is lost by a disaster. Such data loss can be reduced or completely eliminated when a job is resumed using the secondary data even when continuation of the job with the primary data is not feasible due to a failure, or the like. Therefore, specific embodiments can reduce or prevent data loss if an impending disaster is detected and a secondary copy of data is updated before the primary system is harmed.

A variety of techniques may be used in making backup copies of data in storage. In a technique used in conjunction with a synchronous remote copy technology, the operation of a primary system is continued by updating only the primary data. Then, a remote copy that updates the secondary data asynchronously is performed by arranging a secondary processing device for updating the secondary data separated from the primary processing device for operating the primary system. A more detailed description of such techniques may be found in Japanese patent unexamined publication 07-239799, for example.

In another technique, an asynchronous remote copy is performed by a primary storage controller to record primary data. Asynchronous copying is also performed by a secondary storage controller in order to record secondary data in the storage controller to control actual data recording to a recording media. Further details may be found in Japanese patent unexamined publication 11-85408, for more details regarding such techniques.

A variety of techniques can be used to recognize the extent to which secondary data has been updated with respect to the primary data. For instance, an index that indicates an order representing the order of various portions of the primary data to be stored can be also transferred to the primary storage controller when an update of data is requested from the primary processing device. Subsequently, this index can then be transferred to the secondary processing device or the secondary storage controller. Such an index can provide a clear indication of the extent to which the secondary data has been updated. The index can indicate an order with respect to the secondary processing device or the secondary storage controller, so that the various portions of the data are stored in the proper order. Further, this index can be recorded to a journal file, or the like, in which the progress of the primary system processing is recorded. By obtaining such indications, it is possible to reproduce the lost data or to retry the processing, for example.

Figure 1A:
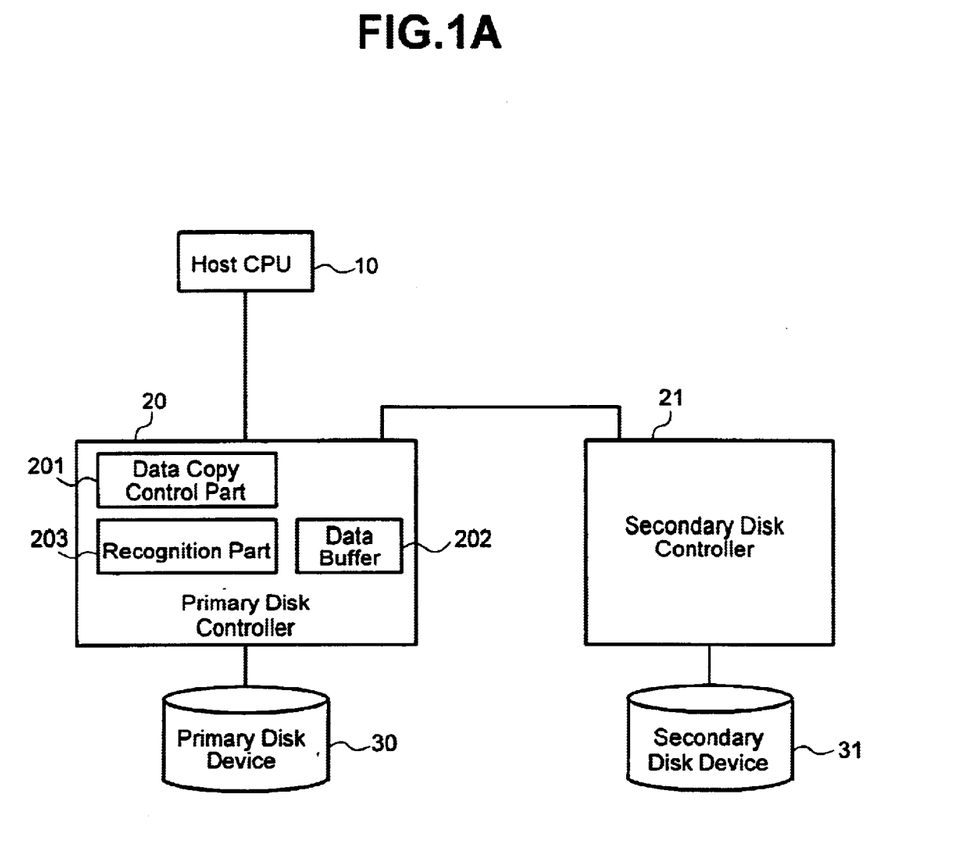
FIG. 1A illustrates a diagram of a representative configuration of an asynchronous remote copy system with a data buffer in accordance with a representative embodiment of the present invention.
Figure 1B:
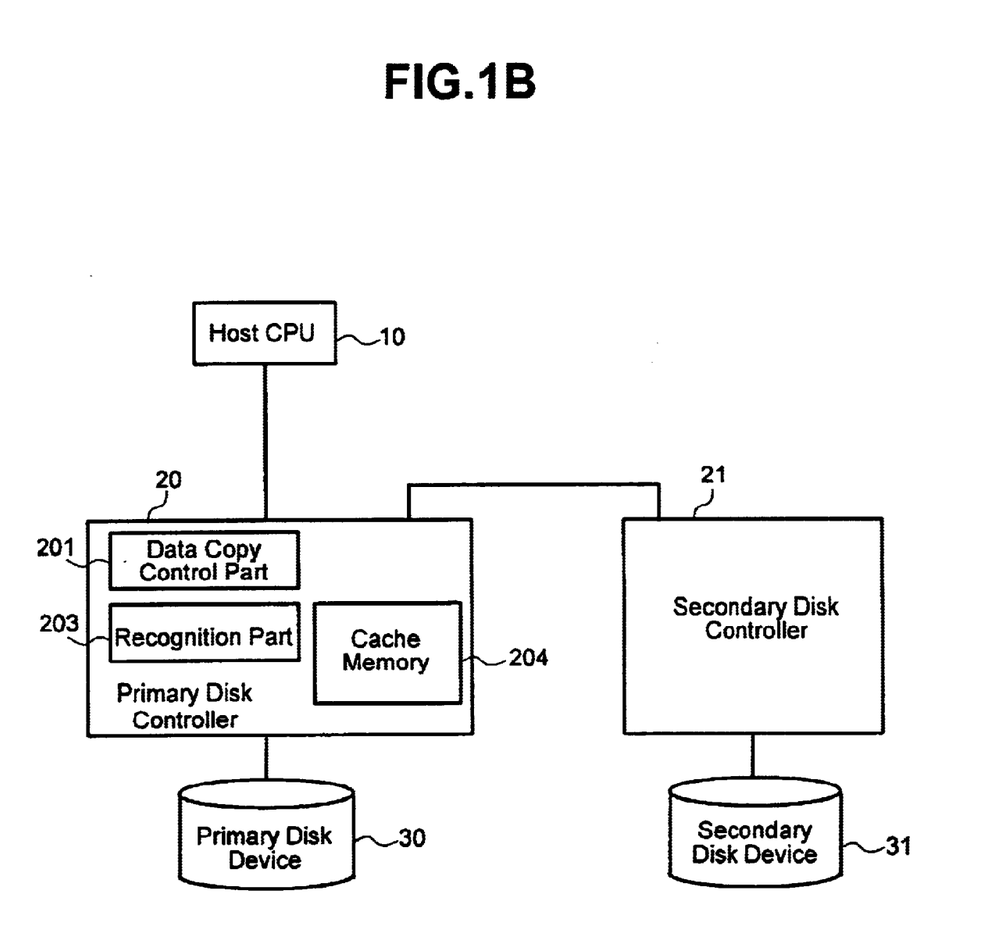
FIG. 1B illustrates a diagram of a representative configuration of an asynchronous remote copy system with a cache memory in accordance with a representative embodiment of the present invention.

FIG. 1A illustrates a diagram showing a representative storage system for performing a remote dual copy in a general-purpose computer system in a representative embodiment of the present invention. In a representative embodiment according to the present invention illustrated by FIG. 1A, a storage system comprises a Host CPU 10, which is a central processing unit in a host unit, a primary disk controller 20, and a primary disk device 30, and constitute the primary storage system. FIG. 1A further illustrates a secondary disk controller 21 and a secondary disk device 31 of the secondary storage system, which is a destination for copying backup data. The primary disk controller 20 comprises a data copy control part 201 which can be circuitry, program logic, or a combination thereof, that controls copying data to the secondary system; a memory such as a data buffer 202 that holds the copy data temporarily; and a recognition part 203 that recognizes a hazard of losing the held data. The recognition part may comprise a detection device, such as a sensor within the primary storage controller 20, such as an earthquake sensor, a thermal sensor to detect a fire, a smoke sensor, a thunder sensor, a moisture sensor, a flood sensor or a detector of supply voltage hazard which may cause a system outage. The memory may be a cache memory 204 as shown in FIG. 1B, for example.

In a representative embodiment according to the present invention, when the host CPU 10 request the primary disk controller 20 to write data into the primary disk devices 30, the primary disk controller 20 writes the data into the buffer 202 in parallel with the disk devices 30. Then, the primary disk controller 20 informs the Host CPU 10 of the completion of the write. Then, the data copy control part 201 of the primary disk controller 20 transfer the data in the data buffer 202 to the secondary disk controller 21, for example. The secondary disk controller 21 writes the received data into the secondary disk devices 31. A remote dual copy can be performed accordingly. The method described above is an asynchronous remote dual copy because after the completion report of the writing into the Host CPU 10, the data is transferred to the secondary disk controller 21, which then creates the secondary data in the secondary disk device 31.

In the event that the primary disk controller 20 and the primary disk device 30 were destroyed by a disaster, such as an earthquake, for example, that occurs during the normal operation of the disk storage system, data is only lost if the disaster were to occur before the data in the data buffer 202 is transferred to the secondary disk controller 21. In order to limit data loss to a minimum, embodiments according to the present invention can include a recognition part 203, that can detect a probable occurrence of a hazardous event. That is, the recognition part 203 recognizes the impending hazard, in order to avoid data loss or to limit it to minimum.

In specific embodiments, recognition part 203 can comprise a variety of sensors, or other hazard detection devices. For example, a sensor provided within the primary disk controller 20 itself may be used. The sensor may be a seismograph to detect an earthquake, for example, or a thermometer or a smoke sensor to detect a fire. A lightning/thunder or storm sensor, could be used to detect inclement weather. A voltage/current detector can be used to detect electric fluctuations. A moisture sensor and/or a flood sensor could be used to detect the presence of water. Thus, recognition part 203 can comprise many types of sensors, or other devices, can be used to detect a probable occurrence of a hazard that could cause damage to the primary disk controller 20 or the primary disk device 30. For example, in specific embodiments, a receiving device that receives information from a sensor located in a room or a building where the primary system is placed may be used. The recognition part 203 may also comprise a recognition system that receives an external attention/warning information or public information broadcast by an external organization such as a meteorological agency, National Weather Service or the like.

In a specific embodiment, when the recognition part 203 detects a hazard of losing the held data, the write request from the Host CPU 10 to the primary disk controller 20 to write new data to the primary disk device 30 is inhibited temporarily. The operation of the primary disk controller 20 is concentrated to performing a copy operation by the data copy control part 201. Alternatively, the primary disk controller 20 makes the data copy control part 201 perform copy operations at a relatively high speed. Normal operation of the primary disk controller 20 is resumed after the hazard of losing the held data is passed. This embodiment reduces likelihood of data loss by decreasing or avoiding un-updated copy data. Accordingly, creation of new un-updated data is reduced, so that little or no data is lost after the un-updated copy data, which is held in the data buffer 202 or the cache memory 204, is copied to the secondary system. Specific embodiments can reduce the likelihood of lost data even if damage occurs to the primary system by a disaster.

In a representative embodiment according to the present invention, a primary disk controller, such as primary disk controller 20 of FIG. 1A, for example, can prioritize the remote copying instead of storing the data into the local non-volatile disk. Specific embodiments that perform remote copying use the remote system as a backup while the local system is down for some reason. In such case, the remote system can replace the local system. If the local system is damaged by a serious disaster, it is not useful to keep the data at the local site. Thus, in such cases, the primary storage system can prioritize the remote copying with respect to storing data to a local non-volatile disk, for example.

In another representative embodiment according to the present invention, a data storage controller, such as primary data storage controller 20 of FIG. 1A, for example, can prioritize the data storage to a local non-volatile disk. This can be especially useful in installations where the remote copying is used to create the remote data merely as backup data. In such embodiments, remote copying provides a non-stop data backup, while the backup to the other media such as magnetic tape, for example, requires stopping of the operation of the system. Thus, in case of a disaster, it may be important to store the data at the local site (to a non-volatile disk, for example). Another embodiment in which higher priority may be given to local copying are installations where there is a possibility that the remote copying path could also break down. In such installations, it is of little use to copy the data to the remote site. Thus, in such embodiments, storing the data at the local site, to a non-volatile disk, or the like, will be given a higher priority over making a remote copy of the data.

Figure 2A:
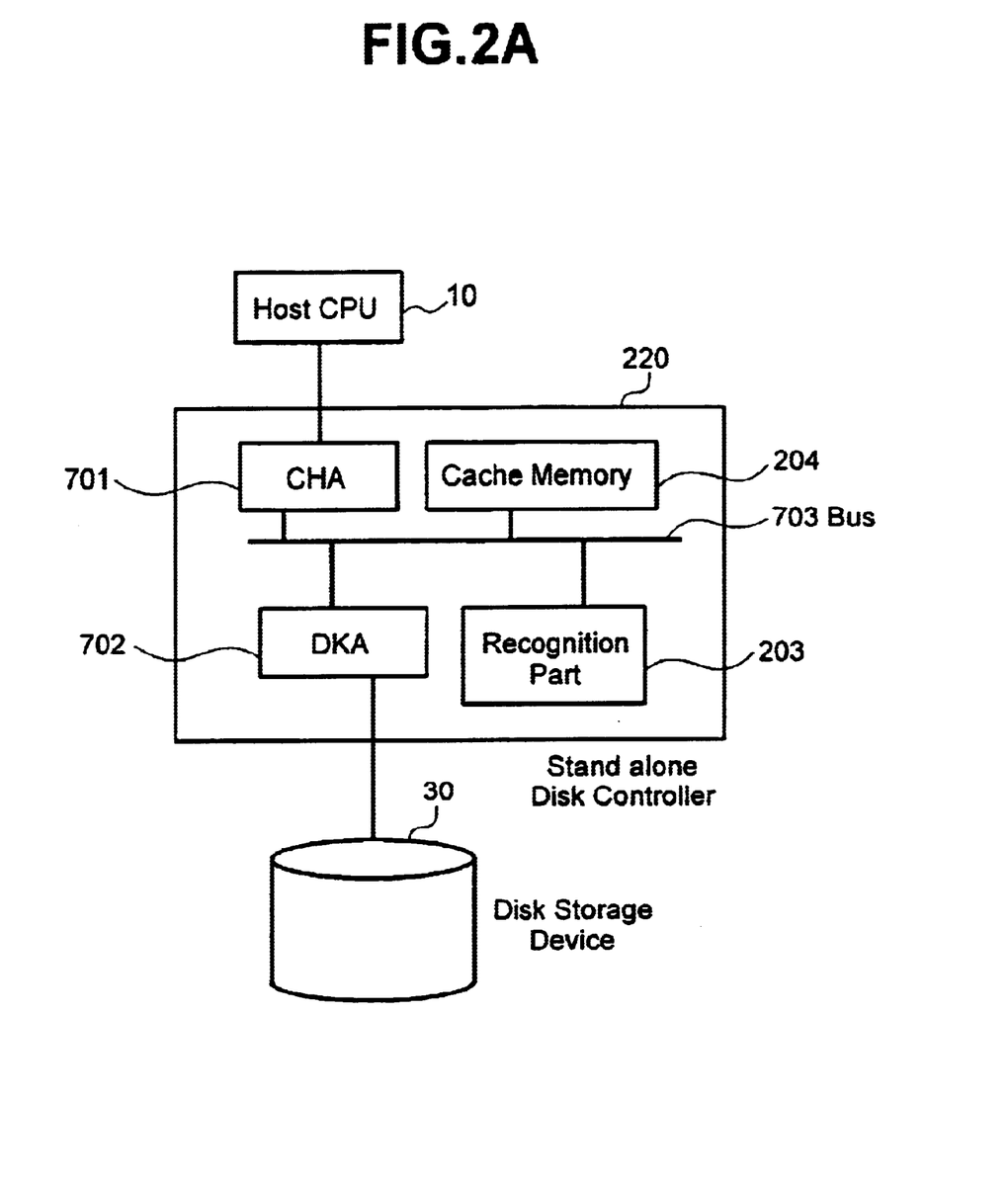
FIG. 2A illustrates a diagram of a representative configuration of a stand alone disk storage system with a hazard sensor in accordance with a representative embodiment of the present invention.

FIG. 2A illustrates a diagram of a representative configuration of a stand alone disk storage system with a hazard sensor in accordance with a representative embodiment of the present invention. FIG. 2A illustrates a disk controller 220 in a particular embodiment. Disk controller 220 comprises a cache memory 204, operable to provide temporary storage for information received from a Host CPU 10, through a channel adapter (CHA) 701, for example. Further, disk controller 220 comprises a plurality of disk storage units, including a disk storage 30, connected to disk controller 220 through a disk adapter (DKA) 702, for example. The disk storage unit 30 provides persistent storage for information written to the disk from Host CPU 10, for example, for later retrieval. Disk controller 220 can further comprise a recognition part 203, which can comprise a detection device, such as a sensor, for example, that can be an earthquake sensor, a thermal sensor to detect a fire, a smoke sensor, a moisture sensor, a flood sensor, a thunder/lightening sensor or a detector of supply voltage hazard which may cause a system outage. A bus 703 interconnects the channel adapter 701, cache memory 204, disk adapter 702 and recognition part 203. Disk controller 220 can further comprise other and varied elements, not shown here, without departing from the scope of the present invention.

Figure 2B:
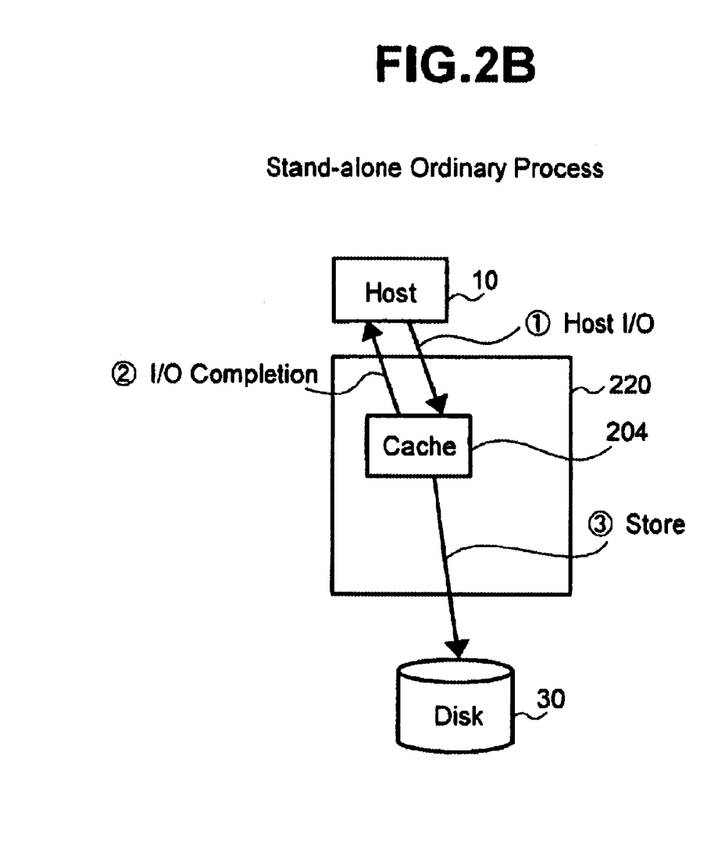
FIG. 2B illustrates a diagram of a representative operation of a stand alone disk storage system with a hazard sensor in accordance with a representative embodiment of the present invention.

FIG. 2B illustrates a diagram of a representative operation of a stand alone disk storage system with a hazard sensor in accordance with a representative embodiment of the present invention. FIG. 2B illustrates processing in a stand alone disk controller 220 of FIG. 2A, for example, when no hazard is present. Write requests (1) made by a Host CPU 10 are received by disk controller 220. Responsive to the write requests, disk controller 220 stores write data in cache memory 204. When the write data has been stored in cache memory 204, a write completion (2) is sent to host CPU 10 in indicate that the data has been successfully received at the disk controller 220. The Host CPU 10, upon receipt of the completion message, will continue processing the job that made the write data request. Then, the write data is transferred (3) from the cache memory 204 into disk storage 30, for example.

Figure 2C:
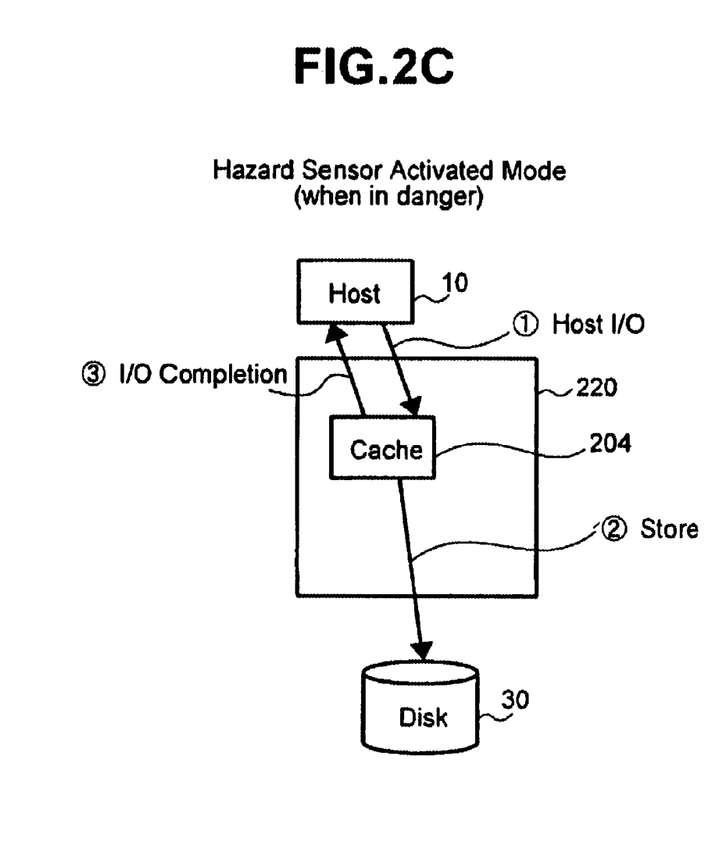
FIG. 2C illustrates a diagram of a representative operation of a stand alone disk storage system with a hazard sensor in accordance with a representative embodiment of the present invention.

FIG. 2C illustrates a diagram of a representative operation of a stand alone disk storage system with a hazard sensor in accordance with a representative embodiment of the present invention. FIG. 2C illustrates processing in a stand alone disk controller 220 of FIG. 2A, for example, when a hazard has been detected. Write requests (1) made by a Host CPU 10 are received by disk controller 220. Responsive to the write requests, disk controller 220 stores write data in cache memory 204. Then, the write data is transferred (2) from the cache memory 204 into disk storage 30, for example. When the write data has been stored in cache memory 204, a write completion (3) is sent to host CPU 10 to indicate that the data has been successfully received at the disk controller 220. The Host CPU 10, upon receipt of the completion message, will continue processing the job that made the write data request.

When the hazard sensor is activated, data can exist in cache memory 204 from a prior write operation, which has not yet been copied to disk storage 30. Therefore, prior to switching from the asynchronous mode illustrated by FIG. 2B to the synchronous copying mode illustrated by FIG. 2C, such un-copied data must be copied from the cache memory 204 and written to the disk storage unit 30, in order to preserve the integrity of the data. One technique for performing this "de-staging" processing will be discussed herein below with reference to FIGS. 5 and 6.

Figure 3A:
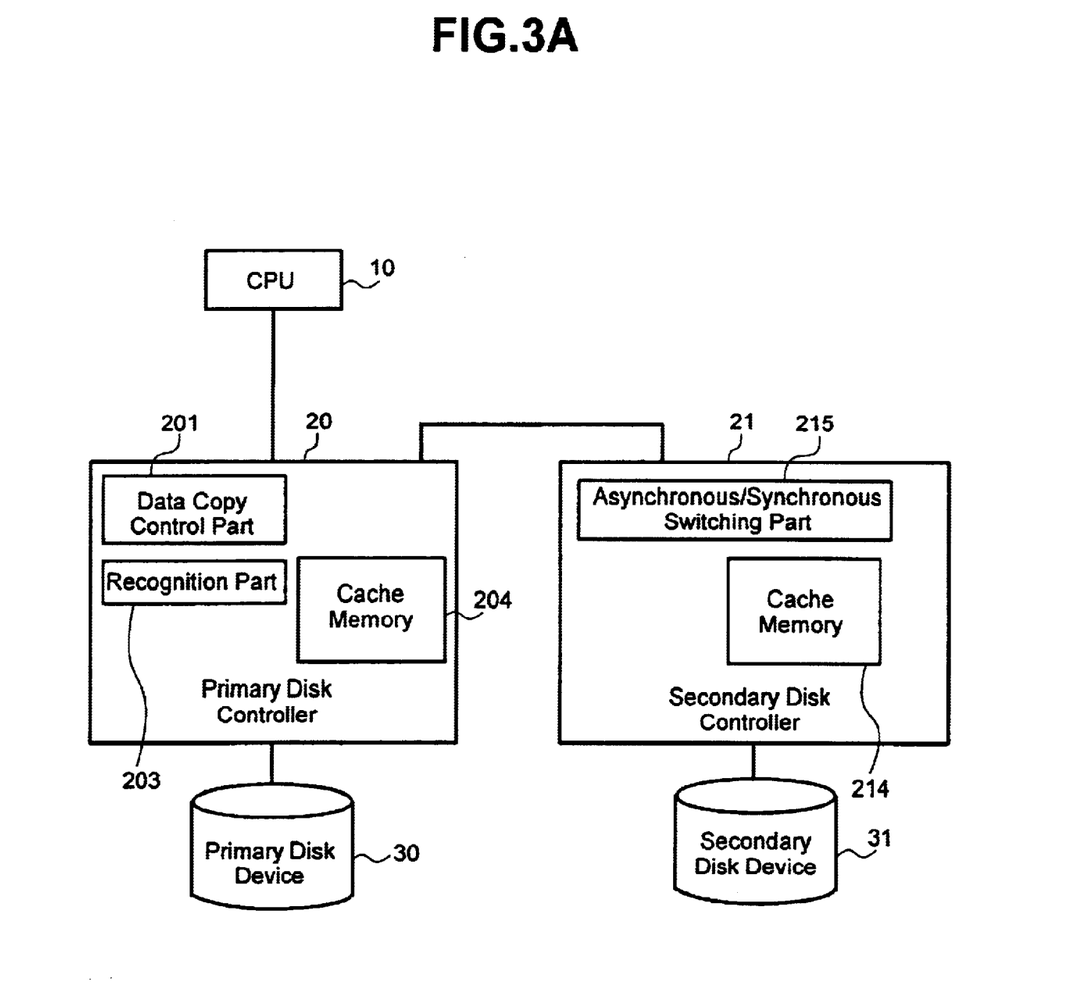
FIG. 3A illustrates a diagram of a representative configuration of an asynchronous remote copy system in accordance with a representative embodiment of the present invention.

Another representative embodiment according to the present invention will be explained by referring to FIG. 3A. FIG. 3A illustrates a system according to a representative embodiment, comprising a secondary disk controller 21 that is provided with a cache memory 214 and an asynchronous/synchronous switching part 215. Other constructions are substantially similar to those discussed herein above with respect to FIG. 1A and FIG. 1B.

In specific embodiments, such as illustrated by FIG. 3A, when recognition part 203 recognizes a hazard of losing held data, operations of the primary disk controller 20 are shifted from an asynchronous remote copy mode to a synchronous remote dual copy mode. Thereafter, data to be written into the primary disk device 30 is also transferred to the secondary disk controller 21 to be written into the secondary disk device 31 in parallel. Accordingly, the primary disk controller 20 informs the Host CPU 10 of write completion after the data copy control part 201 transfers the data in the memory to the secondary disk controller 21 and the secondary disk controller 21 completes writing the received data into the secondary disk device 31. Thus, operation is shifted from asynchronous remote copy to synchronous remote dual copy when recognition part 203 recognizes a hazard of losing held data. The synchronous remote dual copy mode may continue to be performed during the time that the recognition part 203 recognizes a hazard of losing held data.

However, if un-copied data for the secondary disk device 31 is remaining in the cache memory 204, the data to be written in synchronous remote dual copy mode can be written into the secondary disk device 31 ahead of the un-copied data. This can result in corruption of the ordering of the data written by the Host CPU 10. Moreover, if data is to be written into the same location, it may result in new data, written in synchronous remote dual copy mode, being overwritten by old data, received later in asynchronous remote dual copy mode. To preserve data integrity, the write request from the Host CPU 10 can be suspended (i.e., placed in a wait state) while all the un-copied data held in the cache memory 204 is sent to the secondary disk controller 21 before shifting to synchronous remote dual copy mode. Then, the mode is shifted to synchronous remote dual copy mode to accept the request for writing data which has been kept waiting.

If a substantial amount of un-copied data is remaining, however, the write data request is forced to wait long time, so the job of the Host CPU 10 may be terminated abnormally. Even if there are less un-copied data remaining and the waiting time of the request for writing data is short, allowing the request for writing data to wait can cause the associated job in the Host CPU 10 to be delayed. Therefore, remaining data can be copied to a secondary system using a "de-staging" process, as described herein below with reference to FIGS. 5 and 6.

Figure 3B:
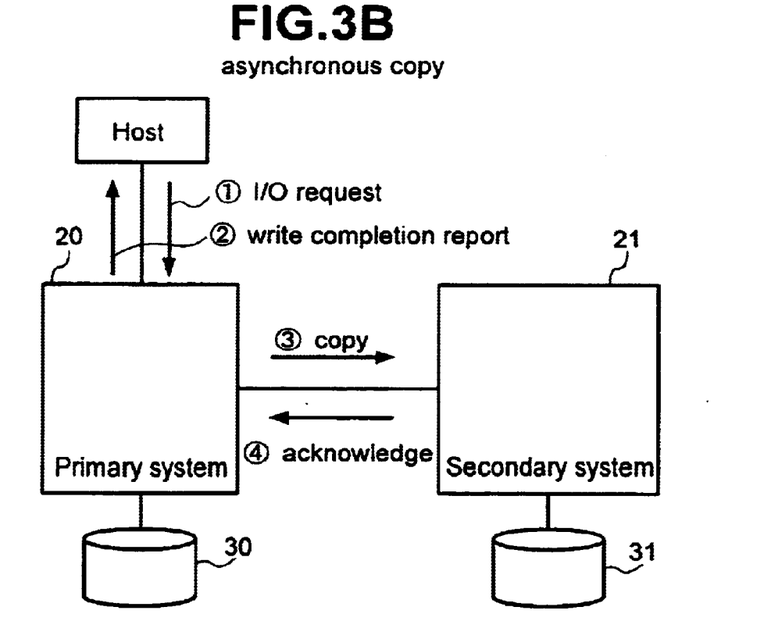
FIG. 3B illustrates a diagram of a representative operation of an asynchronous remote copy system in accordance with a representative embodiment of the present invention.

FIG. 3B illustrates a diagram of a representative operation of an asynchronous remote copy system in accordance with a representative embodiment of the present invention. FIG. 3B illustrates processing in a remote copy storage system such as that of FIG. 3A, for example, when no hazard has been detected. Write requests (1) made by a Host CPU 10 are received by primary disk controller 20. Responsive to the write requests, primary disk controller 20 stores write data in local memory. When the write data has been stored in local memory, a write completion (2) is sent to host CPU 10 to indicate that the data has been successfully received at the primary disk controller 20. The Host CPU 10, upon receipt of the completion message, will continue processing the job that made the write data request. Then, a copy of write data is transferred (3) from the primary disk controller 20 to a secondary (remotable) disk controller 21. Then an acknowledgment (4) is sent from secondary disk controller 21 to primary disk controller 20.

Figure 3C:
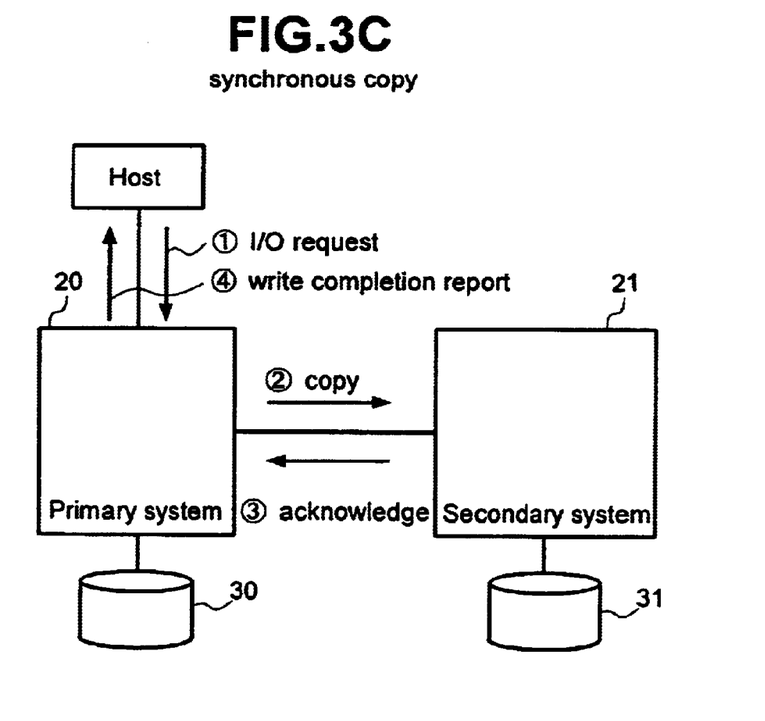
FIG. 3C illustrates a diagram of a representative operation of a synchronous remote copy system in accordance with a representative embodiment of the present invention.

FIG. 3C illustrates a diagram of a representative operation of a synchronous remote copy system in accordance with a representative embodiment of the present invention. FIG. 3C illustrates processing in a remote copy storage system such as that of FIG. 3A, for example, when a hazard has been detected. Write requests made by a Host CPU 10 are received by the primary disk controller 20. Responsive to a write request (1) primary disk controller 20 stores write data in local memory. Then, the write data is transferred (2) from the local memory to a secondary (remotable) disk controller 21, for example. When the write data has been stored in the secondary disk controller 21, an acknowledgment (3) is sent from secondary disk controller 21 to primary disk controller 20. Then, a write completion (4) is sent from primary disk controller 20 to host CPU 10 to indicate that the data has been successfully stored. The Host CPU 10, upon receipt of the completion message, will continue processing the job that made the write data request.

When the hazard sensor is activated, data can exist in local memory in the primary disk controller 20 from a prior write operation, which has not yet been copied to secondary disk controller 21. Therefore, prior to switching to the synchronous copying mode illustrated by FIG. 3C, such un-copied data must be copied from the primary disk controller 20 and written to the secondary disk controller 21, in order to preserve the integrity of the data. One technique for performing this "de-staging" processing will be discussed herein below with reference to FIGS. 5 and 6.

Figure 5:
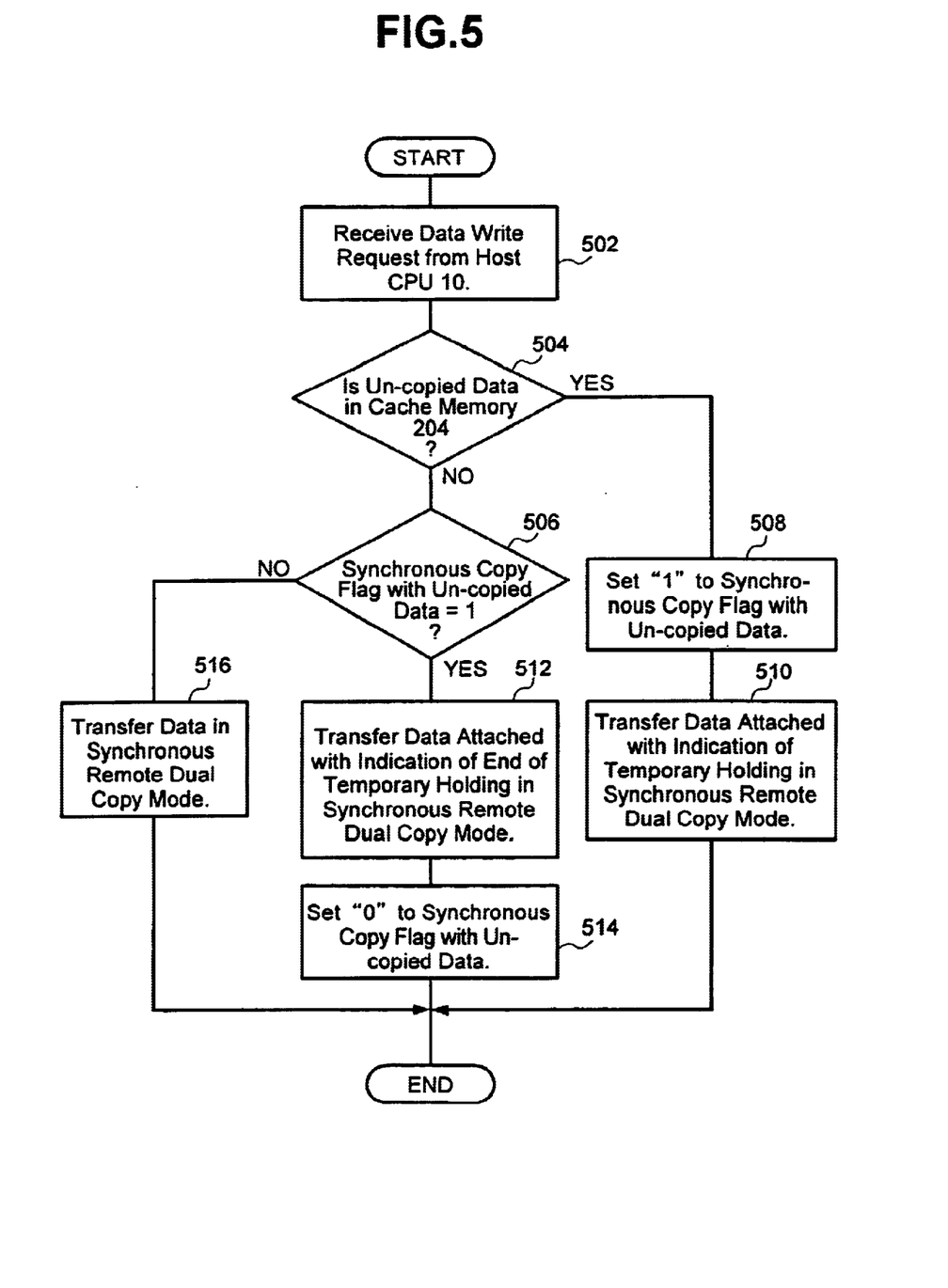
FIG. 5 illustrates a flowchart of representative primary disk controller operation in accordance with a representative embodiment of the present invention.

FIG. 5 illustrates operation of synchronous remote dual copy in the data copy control part 201 in a representative embodiment according to the present invention. FIG. 5 illustrates a step 502, in which a primary disk controller, such as primary disk controller 20 of FIG. 3A, for example, receives a data write request from Host CPU 10. In a step 504, responsive to the data write request from the Host CPU 10, primary disk controller 20 determines whether there is un-copied data present in cache memory 204. If, in step 504 it is determined that un-copied data remains in the cache memory 204 for the secondary disk device 31 after shifting to synchronous remote dual copy mode, then in a step 508, the data copy control part 201 sets a flag which indicates synchronous remote dual copy operation with un-copied data remaining (that is, a synchronous copy flag with un-copied data remaining =1). Then, in a step 510, data is transferred with the flag attached in order to provide an indication of temporary holding in synchronous remote dual copy mode. The flag is used to indicate transfer of the data to the secondary disk controller 21 in synchronous remote dual copy mode.

Figure 6:
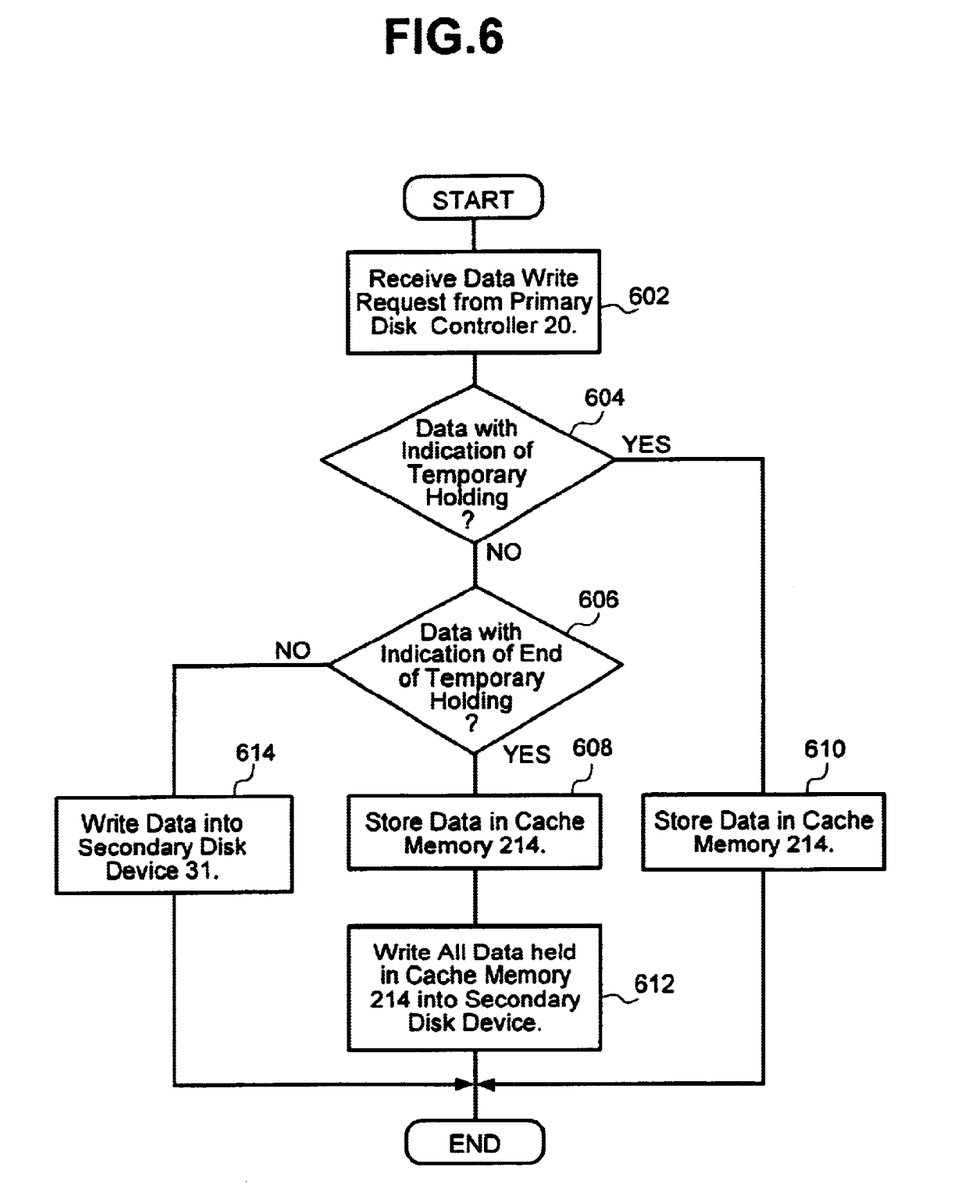
FIG. 6 illustrates a flowchart of representative secondary disk controller operation in accordance with a representative embodiment of the present invention.

FIG. 6 illustrates operation of the asynchronous/synchronous switching part 215 in a representative embodiment according to the present invention. FIG. 6 illustrates a step 602, in which the secondary disk controller 21 receives a data write request from primary disk controller 20. Responsive to this write request, in a step 604, the secondary disk controller 21 checks for the presence of the flag that indicates transfer of the data is in synchronous remote dual copy mode and that temporary holding is desired. If, in step 604, temporary holding of the data is indicated, then in a step 610, the asynchronous/synchronous switching part 215 of secondary disk controller 21 stores the received data with temporary holding indication in the cache memory 214 in the secondary system in a manner that preserves the order of the data, and temporarily suspends writing the data to the secondary disk device 31. In a specific embodiment, a FIFO queue is used to preserve order of the data, however, other techniques known to those of ordinary skill in the art can also be used.

After the un-copied data for the secondary disk device 31 in the cache memory 204 is transferred to the secondary disk controller 21, as determined in step 504 of FIG. 5 processing continues with a step 506, in which it is determined whether the synchronous copy flag with un-copied data is set (i.e., =1 in a specific embodiment). If in step 506, the synchronous copy flag is still set, but there is no further data remaining in the cache memory 204, then in a step 512, the data copy control part 201 sends the data with an indication for ending the temporary holding at the next transferring to the secondary disk controller 21 in synchronous remote dual copy since it can be recognized, by looking the synchronous copy flag with un-copied data remaining to be 1, that synchronous remote dual copy of un-copied data was performed. Then, in a step 514, the synchronous copy flag with un-copied data remaining is cleared (that is, =0). FIG. 6 illustrates step 604, which determines that the indication of temporary holding is no longer present and passes control to a step 606. In step 606, it is determined whether data having an indication to end temporary holding has been received. If, in step 606, data having an indication of ending temporary holding has been received, then in a step 608, the secondary disk controller 21 also stores the received data with the indication of ending of temporary holding in the cache memory 214 in order to preserve proper order of the data. Then, in a step 612, the data held in cache memory 214 is written into the secondary disk device 31 in proper order.

As for subsequent requests for writing data from the Host CPU 10, FIG. 5 illustrates a step 516, in which the data copy control part 201 transfers data without special indication in synchronous remote dual copy mode. FIG. 6 illustrates a step 614, in which the asynchronous/synchronous switching part 215 of secondary disk controller 30 writes the data into the secondary disk device 31 upon receipt without storing the data in the cache memory 214 for temporary holding. The data received without the indication of temporary holding is the remaining un-copied data. This data is written into the secondary disk device 31 upon its receipt.

When a hazard of losing held data has subsided, specific embodiments can return to asynchronous remote dual copy mode directly since order of writing data to the secondary disk device 31 would not be adversely affected by switching back to asynchronous copy mode.

As described above, it is possible to shift the mode from asynchronous remote dual copy to synchronous remote dual copy without waiting time of the request for writing data from Host CPU 10.

Figure 4:
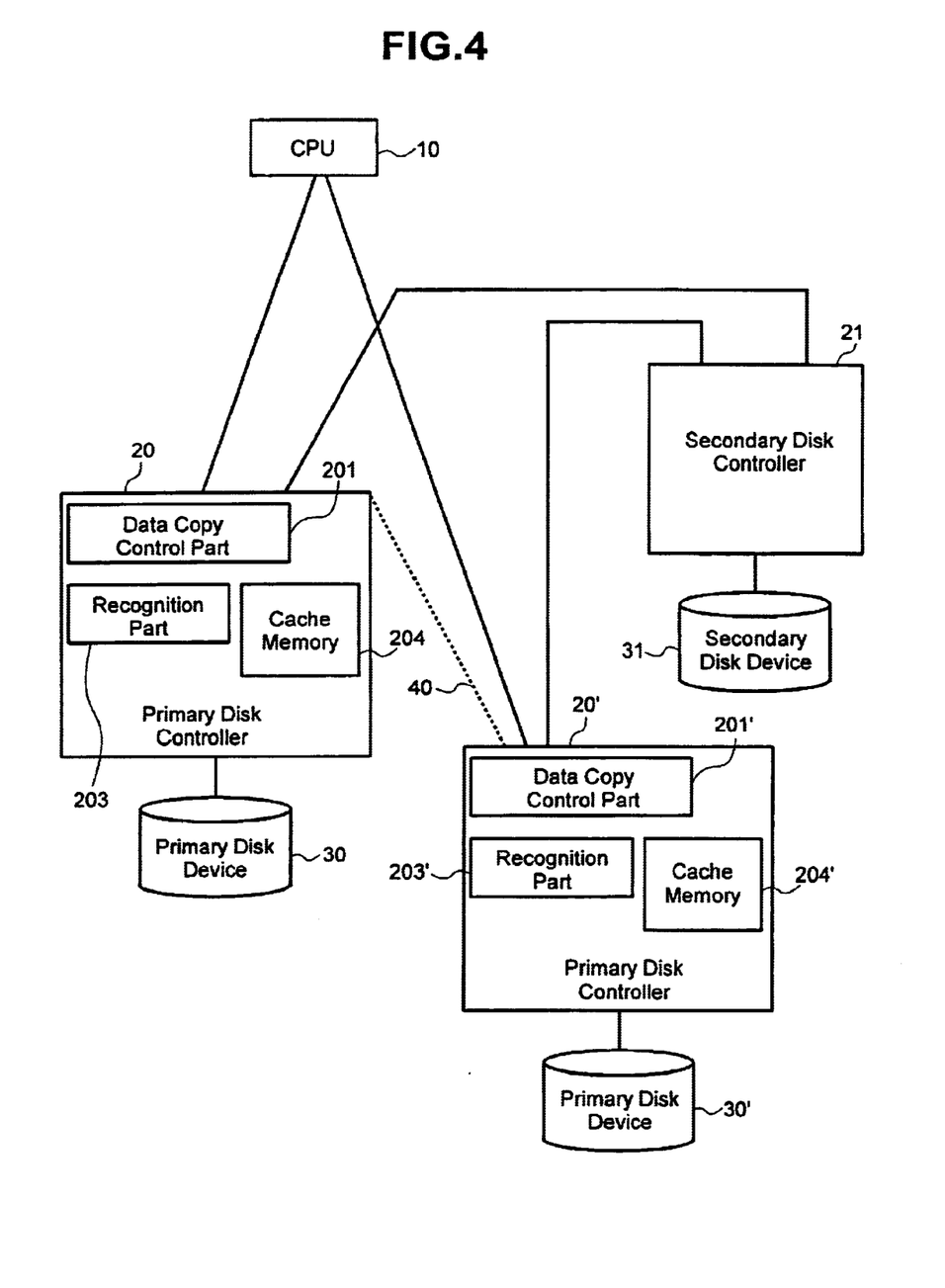
FIG. 4 illustrates a diagram of a representative configuration of an asynchronous remote copy system with a plurality of primary disk controllers in accordance with a representative embodiment of the present invention.

FIG. 4 illustrates a diagram of a representative embodiment according to the present invention. As illustrated by FIG. 4, a primary disk controller 20', connected to a primary disk device 30', is connected to a Host CPU 10, which is further connected to a primary disk controller 20 and primary disk 30, as illustrated in FIG. 1A. The primary disk controller 20' comprises a data copy control part 201', a recognition part 203', and a cache memory 204'. The primary disk controller 20 and the primary disk controller 20' are connected with a communication line 40.

In a representative embodiment according to the present invention as illustrated by FIG. 4, a plurality of primary disk controllers may be connected to a single host CPU and further to a single remotable secondary disk controller. Recognition timing of each primary disk controller can be different, since each primary disk controller recognizes the possibility of losing data individually. Recognition timing is the timing of recognizing a probable occurrence of a hazardous event by a primary disk controller. In this embodiment, when the data to be written to the primary disk controller 20 from the Host CPU 10 and the data to be written to the primary disk controller 20' from the Host CPU 10 relate to each other, this relationship is lost if either of the data is the only unerased data remaining (that is, copied data). Specific embodiments can prevent such occurrence by providing for either of the primary disk controller 20 and the primary disk controller 20', upon recognizing the possibility of losing data, to notify the other primary disk controller of this possibility. The recognition timing on each side of the possibility of losing data coincides to this notification, so that the damage resulting from a loss of data due to a disaster can be reduced even in case of the configuration of a plurality of primary disk controllers.

The processing after the recognition of a hazard of losing data in the embodiment illustrated by FIG. 4 may be similar to that of the embodiments discussed herein above with reference to FIGS. 1A–1B, 2A–2C and 3A–3C.

It is necessary to consider the relative location of a sensor and the storage controller if the sensor for recognition of a hazard potentially leading to loss of un-copied data is located outside of the device. However, the position of the device is not limited according to the present invention since the detector can be placed inside the device as well, in various specific embodiments.

Some embodiments can provide earlier recognition of a fire, and the like, by receiving external information for the recognition of a hazard potentially leading to a loss of un-copied data. Select embodiments can provide consistency throughout a whole system, even in embodiments with a plurality of primary disk controllers, since the recognition timing of a hazard of losing un-copied data that coincides with the primary disk controllers.

Embodiments in which a device contains a relatively large volume of un-copied data, the data from Host CPU is written into the secondary disk device in order for updating, so that the copy mode can be shifted to synchronous remote copy mode and loss of data can be avoided after the recognition of a hazard.

As used herein, terms such as controller, control section, recognition part, sensor, detector, and the like can refer to hardware, software and/or mixed hardware and software elements in various specific embodiments according to the present invention.

The preceding has been a description of the preferred embodiment of the invention. It will be appreciated that deviations and modifications can be made without departing from the scope of the invention, which is defined by the appended claims.

What is claimed is:

1. A data storage apparatus comprising:

at least one of a plurality of storage media;

a cache memory;

a controller configured to move data into and out of said at least one of a plurality of storage media and said cache memory; said controller further configured to receive data from an external source for storage; and a hazard sensor configured to detect a probable occurrence of a hazardous event external of the data storage system; wherein responsive to said hazard sensor detecting a probable occurrence of a hazardous event, said controller copies data from said cache memory to said at least one of a plurality of storage media.

2. The data storage apparatus of claim 1, wherein:

said hazard sensor detecting a probable occurrence of a hazardous event external of the data storage system includes at least one of: operation of a seismograph, recognition of an indicator of a fire, operation of a smoke sensor, detection of voltage fluctuation, sensing lightning, receiving public information from a meteorological agency, sensing moisture, sensing a flood and receiving external attention/warning information.

3. A data storage apparatus comprising:

at least one of a plurality of storage media;

a cache memory;

a controller configured to move data into and out of said at least one of a plurality of storage media and said cache memory; said controller further configured to receive data from an external source for storage; and a hazard sensor; wherein responsive to said hazard sensor detecting a probable occurrence of a hazardous event, said controller copies data from said cache memory to said at least one of a plurality of storage media, and said controller receiving data from said external source delays sending an acknowledgment to said external source until said data is copied into said at least one of a plurality of storage media.

4. The data storage apparatus of claim 3, wherein:

responsive to said hazard sensor determining that a hazardous event is no longer probable, said controller receiving data from said external source sends an acknowledgment to said external source prior to copying said data into said at least one of a plurality of storage media.

5. A data storage apparatus comprising:

at least one of a plurality of storage media;

a cache memory;

a controller configured to move data into and out of said at least one of a plurality of storage media and said cache memory; said controller further configured to receive data from an external source for storage; and a hazard sensor; wherein responsive to said hazard sensor detecting a probable occurrence of a hazardous event, said controller copies data from said cache memory to said at least one of a plurality of storage media, and said controller receiving data from said external source for storage is temporarily suspended while said controller copying said data from said cache memory to said at least one of a plurality of storage media is performed.

6. A data storage apparatus comprising:

at least one of a plurality of storage media;

a cache memory;

a controller configured to move data into and out of said at least one of a plurality of storage media and said cache memory; said controller further configured to receive data from an external source for storage; and a hazard sensor; wherein responsive to said hazard sensor detecting a probable occurrence of a hazardous event, said controller copies data from said cache memory to said at least one of a plurality of storage media, and said controller copying said data from said cache memory to said at least one of a plurality of storage media is performed with a higher priority than said controller receiving data from said external source for storage.

7. A data storage apparatus comprising:

at least one of a plurality of storage media;

a cache memory;

a controller configured to move data into and out of said at least one of a plurality of storage media and said cache memory; said controller further configured to receive data from an external source for storage; and a hazard sensor; and a link to a remotable storage system; wherein
responsive to said hazard sensor detecting a probable occurrence of a hazardous event, said controller copies data from said cache memory to said at least one of a plurality of storage media, and wherein said controller copying data from said cache memory further comprises said controller copying said data over said link to said remotable storage system.

8. The data storage apparatus of claim 7, wherein said controller responsive to said hazard sensor detecting a probable occurrence of a hazardous event, copying said data over said link to said remotable storage system is performed with a higher priority than said controller copying data from said cache memory to said at least one of a plurality of storage media.

9. The data storage apparatus of claim 7, wherein said controller responsive to said hazard sensor detecting a probable occurrence of a hazardous event, copying data from said cache memory to said at least one of a plurality of storage media is performed with a higher priority than said controller copying said data over said link to said remotable storage system.

10. A data storage apparatus comprising:
at least one of a plurality of storage media;
a cache memory;
a controller configured to move data into and out of said at least one of a plurality of storage media and said cache memory; said controller further configured to receive data from an external source for storage; and
a hazard sensor; and
a link to a remotable storage system; wherein
responsive to said hazard sensor detecting a probable occurrence of a hazardous event, said controller copies data from said cache memory to said at least one of a plurality of storage media, and said controller copying data from said cache memory further comprises said controller copying said data over said link to said remotable storage system, wherein
said controller copying said data over said link to said remotable storage system is performed asynchronously, until, responsive to said hazard sensor detecting a probable occurrence of a hazardous event, said controller performs said copying of said data over said link to said remotable storage system synchronously.

11. The data storage apparatus of claim 10, wherein responsive to said hazard sensor determining that a hazardous event is no longer probable, said controller switches from copying said data over said link to said remotable storage system synchronously to copying said data over said link to said remotable storage system asynchronously.

12. A data storage system, comprising:
a first data storage system, said first data storage system further comprising:
a storage device that stores data received from a computer; and
a storage controller, said storage controller comprising:
a memory to hold said data temporarily, and
a recognition part to recognize a possibility of a hazard;
a data link; and
a second data storage system, connected by said data link to said first data storage system;
wherein when said recognition part of said first data storage system provides a warning of a possibility of a hazard, thereupon said storage controller of said first data storage system copies data stored in said memory to said second data storage system over said data link.

13. The data storage system of claim 12, wherein:
responsive to said recognition part of said first data storage system providing said warning of said possibility of a hazard, said storage controller of said first data storage system switches from an asynchronous copying to a synchronous copying of said data stored in said memory to said second data storage system over said data link.

14. The data storage system of claim 12, further comprising:
a third data storage system, said third data storage system having a third data storage controller; and
a communication link connecting said third data storage controller to said data storage controller of said first data storage system; and wherein:
when said first data storage system and said third data storage system function co-operatively, said data storage controller of said first data storage system and said third data storage controller communicate with each other over said communication link after recognition of a hazard of losing said data.

15. A method for controlling a data storage system, said data storage system comprising a storage controller, a storage device, and a memory, said method comprising:
receiving from an external source a request to write data to said storage device;
storing said data relating to said request within said memory;
reporting completion of said request to write to said external source;
copying said data held in said memory to said storage device;
responsive to recognizing a possibility of losing said data held in said memory, copying any data remaining in said memory into said storage device prior to accepting another request to write data from an external source.

16. A method for controlling a data storage system, said data storage system comprising a storage controller, a storage device, and a memory, said method comprising:
receiving from an external source a request to write data to said storage device;
storing said data relating to said request within said memory;
copying said data held in said memory to said storage device;
responsive to recognizing a possibility of losing said data held in said memory, delaying reporting completion of said request to write to said external source until completing copying any data remaining in said memory into said storage device prior to accepting another request to write data from an external source.

17. A method for controlling a data storage system, said data storage system comprising a storage controller, a storage device, and a memory, said method comprising:
receiving from an external source a request to write data to said storage device;
storing said data relating to said request within said memory;
reporting completion of said request to write to said external source;
copying said data held in said memory to said storage device;
responsive to recognizing a possibility of losing said data held in said memory, performing copying any data remaining in said memory into said storage device at a higher priority to accepting another request to write data from an external source.

18. A control method for use in a data storage system that comprises a storage controller, a storage device, and a memory, said method comprising:
receiving a request to write data to said storage device from a computer,
holding the data relating to said request within said memory,
returning a report of completion of writing to said computer,
copying said data held in said memory to a second data storage system,
recognizing a possibility of losing said held data, and
suspending temporarily receiving of said request to write from said computer if a possibility of losing said held data is recognized.

19. A control method for use in a data storage system that comprises a storage controller, a storage device, and a memory, said method comprising:
receiving a request to write data to said storage device from a computer,
holding the data relating to said request within said memory,
returning a report of completion of writing to said computer,
copying said data held in said memory to a second data storage system,
recognizing a possibility of losing said held data, and thereupon, if said possibility of losing said held data is recognized,
performing said copying of any un-copied data held in said memory to said second data storage system prior to storing any data into said storage device.

20. A control method for use in a data storage system that comprises a storage controller, a storage device, and a memory, said method comprising:
receiving a request to write data to said storage device from a computer,
holding the data relating to said request within said memory,
returning a report of completion of writing to said computer,
copying said data held in said memory to a second data storage system,
recognizing a possibility of losing said held data, and thereupon, if said possibility of losing said held data is recognized,
performing storing of any data remaining in said memory into said storage device prior to copying any un-copied data in said memory to said second data storage system.

21. A control method for use in a data storage system that comprises a storage controller, a storage device, and a memory, said method comprising:
receiving a request to write data to said storage device from a computer,
holding the data relating to said request to write within said memory,
returning a report of completion of writing to said computer,
copying said data held in said memory to a second storage system,
recognizing a possibility of losing said held data,
responsive to recognition of a possibility of losing said held data, copying the data, requested to be written to said storage device by said computer, to said second storage system; and
returning a report of completion of writing to said computer.

22. A control method for use in a remote copy system that comprises a primary storage system having a primary storage controller, a primary storage device, and a primary memory and a secondary storage system having a secondary storage controller, a secondary storage device, and a secondary memory, said method comprising:
receiving a request to write data into said primary storage device from a computer,
holding the data relating to said request within said primary memory,
returning a report of completion of writing to said computer,
copying said data held in said primary memory to said secondary storage system; and
recognizing a possibility of losing said held data, and responsive to recognition of a possibility of losing said held data,
copying the data, requested to be written to said primary storage device by said computer to said secondary storage device; and
returning a report of completion of writing to said computer.

23. The control method for use in a remote copy system of claim 22, wherein said copying the data, requested to be written to said primary storage device by said computer to said secondary storage device after the recognition of a possibility of losing said held data, further comprises:
detecting if un-copied data for said secondary storage system is remaining in said primary memory,
holding the copy data which is transferred to said secondary storage system and that is related to a new request to write by said computer if said un-copied data is found, and
storing the data in said secondary memory to said secondary storage device in order after receiving all said un-copied data by said secondary storage system.

24. The control method for use in a remote copy system of claim 22, wherein said copying the data, requested to be written to said primary storage device by said computer to said secondary storage device after the recognition of a possibility of losing said held data, further comprises:
detecting if un-copied data for said secondary storage system is remaining in said primary memory,
copying the data, relating to the request to write by said computer, with an indication for temporary holding to said secondary storage system
returning a report of completion of writing to said computer if said uncopied data is found,
copying the data, relating to the request to write by said computer, with an indication of end of temporary holding to said secondary storage system;
returning a report of completion of writing to said computer after completion of copying said un-copied data,
in said secondary storage system, holding the data with said indication for temporary holding and the data with said indication of end of temporary holding, relating to said request to write by said computer, in said secondary memory, and storing the data held in said secondary memory to said secondary storage device in order.

* * * * *